April 14, 1959     R. M. BOYKIN     2,881,532
COURSE SPACING TOOL
Filed June 11, 1957
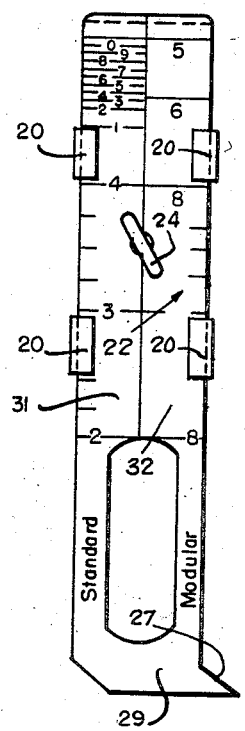
FIG. 1.
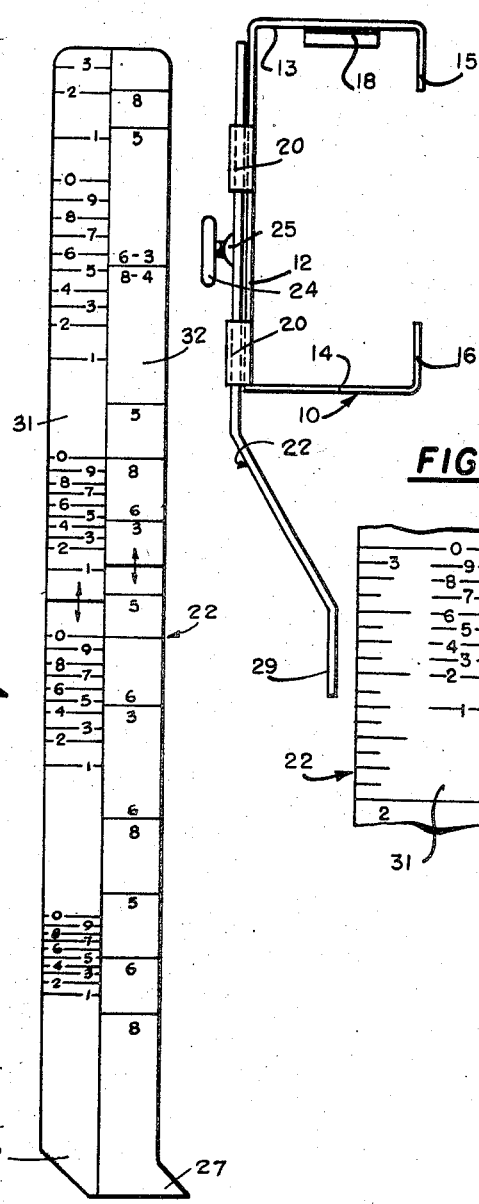
FIG. 2.
FIG. 1A.
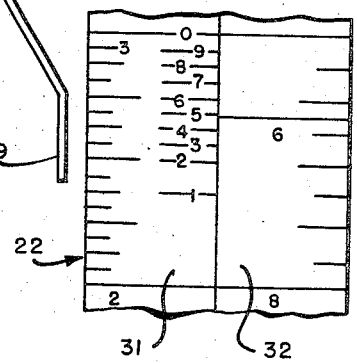
FIG. 3.
INVENTOR.
Robert M. Boykin 2,881,532

COURSE SPACING TOOL

Robert M. Boykin, Huntsville, Tex.

Application June 11, 1957, Serial No. 664,971

3 Claims. (Cl. 33—180)

This invention relates to a masonry gauge and more particularly to a gauge for uniformly spacing the courses of various types of building blocks.

It is an object of the present invention to provide a course spacing gauge for masons having means for accurately and uniformly spacing any masonry material which lays up in courses.

It is another object of the present invention to provide a brick mason's course spacing gauge gaving means for accurately spacing each course of any masonry material so as to facilitate the construction of a masonry structure of predetermined height and which may be easily and readily mounted upon a mason's spirit level.

Other objects of the invention are to provide a masonry course spacing gauge bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a front elevational view of a masonry course spacing gauge made in accordance with the present invention;

Figure 1A is an enlarged fragmentary view of a portion of the scale shown on the gauge in Figure 1;

Figure 2 is a side elevational view of the gauge shown in Figure 1; and

Figure 3 is a view similar to Figure 1, showing a modified form of slide for accurate spacing of courses of masonary material not exceeding ten inches in thickness.

Referring now more in detail to the drawing, and more particularly to Figures 1 and 2 thereof, a masonry course spacing gauge made in accordance with the present invention is shown to include a main body portion 10 of substantially channel shaped configuration. This portion includes a main web 12 having a flange 13, 14, extending perpendicularly outwardly from each end thereof. The outer end of each flange 13, 14, is provided with inwardly facing projections 15, 16, that lie in substantially the same plane.

The main body portion 10 is arranged to be slidably supported upon a standard mason's spirit level and is provided with a friction type spring element 18 that is secured to the inside surface of the upper flange 13. This spring element maintains the gauge in any desired position along the length of the spirit level, while permitting the gauge to be readily adjusted thereon. The main web 12 is also provided with a plurality of rearwardly extending ears 20 of angle shaped configuration that extend toward each other to define a guide arrangement for slidably receiving a slide 22 therein. This slide 22 is of substantially elongated shape and has a thumb screw 24 extending through a threaded boss 25 which bears against the rearward surface of the main web 12 to adjustably secure the slide 22 in an adjusted longitudinal position with respect to the main body portion 10. The lower end of the slide 22 is provided with a triangular tip 27 that defines an index portion that is disposed at the end of the inwardly off-set flange 29. One edge of the slide 22 is provided with a standard brick scale 31 while the opposite edge thereof is provided with a modular brick scale 32.

In use, the mason must first consider the height of the structure to be erected and the number of courses of equal thickness that are required to produce a structure of that height. This may be determined by use of a spacing rule or by mathematical calculation. After determining the required thickness of each course, the gauge is then set accordingly by adjusting the slide 22 with reference to either the standard brick scale 31 or the modular brick scale 32. The gauge is then placed upon the end of the spirit level with the triangular index portion extending toward the center of the level. By then engaging the index portion or triangular tip 27 with the previously laid course, the level of the next course is automatically determined by the height of the spirit level.

In the event that the masonry material is less than ten inches thick, a gauge having a scale of the type shown in Figure 3 is used. In all other cases, a gauge having a scale of the type shown in Figures 1 and 1A is used.

This gauge does not restrict the use of the spirit level as it may readily be removed therefrom whenever desired without effecting the predetermined setting. This gauge is also useful in setting a twig, for obtaining uniform vertical joints in a soldier course, in uniformly spacing a rollock, for corbels and recessed courses.

While various changes may be made in the detail construction, it shall be understood that such changes shall be within the spirit and scope of the present invention as defined by the appended claims.

What I claim as new and desire to protect by Letters Patent of the United States is:

1. A course spacing tool comprising, in combination, a main body portion having a surface for slidable engagement upon a spirit level, a slide adjustably carried by said main body portion and extending in a direction perpendicular to the direction of movement of said main body portion with respect to the spirit level, said slide having a standard brick scale on one edge and a modular brick scale along the opposite edge, the outer end of said slide including an index element for engaging an adjacent course of bricks to automatically position said level at the proper height for a subsequent course of bricks, said main body portion being of channel shaped configuration having a main web and a pair of outwardly extending flanges for encompassing the body of a spirit level, and a friction spring supported upon one of said flanges within said channel frictionally resisting movement between the body of the spirit level and said main body portion.

2. The combination according to claim 1, wherein said slide includes positioning means for adjusting the position of said index element with respect to said main body portion.

3. The combination according to claim 2, wherein said index element includes an offset flange of triangular configuration.

References Cited in the file of this patent

UNITED STATES PATENTS

| | | |
|---|---|---|
| 1,139,165 | Cobb | May 11, 1915 |
| 2,686,974 | Lanner | Aug. 24, 1954 |
| 2,769,272 | Van Cantie | Aug. 28, 1956 |